United States Patent
Kannan et al.

(10) Patent No.: US 9,971,584 B2
(45) Date of Patent: May 15, 2018

(54) PACKAGED APPLICATION DELIVERY FOR CONVERGED INFRASTRUCTURE

(75) Inventors: Hariharan Kannan, San Jose, CA (US); Faisal Choudry, London (GB); Mohit Kshirsagar, Santa Clara, CA (US); Rahul Talekar, San Jose, CA (US)

(73) Assignee: VCE IP Holding Company LLC, Richardson, TX (US)

(*) Notice: Subject to any disclaimer, the term of this patent is extended or adjusted under 35 U.S.C. 154(b) by 259 days.

(21) Appl. No.: 13/597,125

(22) Filed: Aug. 28, 2012

(65) Prior Publication Data

US 2014/0068599 A1    Mar. 6, 2014

(51) Int. Cl.
  *G06F 9/455* (2018.01)
  *G06F 9/445* (2018.01)
  *G06F 9/50* (2006.01)

(52) U.S. Cl.
  CPC .............. *G06F 8/61* (2013.01); *G06F 9/5066* (2013.01); *G06F 9/45533* (2013.01)

(58) Field of Classification Search
  None
  See application file for complete search history.

(56) References Cited

U.S. PATENT DOCUMENTS

| | | | |
|---|---|---|---|
| 8,286,174 B1* | 10/2012 | Schmidt et al. | 718/104 |
| 2008/0184229 A1* | 7/2008 | Rosu et al. | 718/1 |
| 2011/0004676 A1* | 1/2011 | Kawato | 709/221 |
| 2011/0035747 A1* | 2/2011 | Machida | 718/100 |
| 2011/0231696 A1* | 9/2011 | Ji | G06F 11/1438 714/3 |
| 2011/0246830 A1* | 10/2011 | Chowdhury et al. | 714/35 |
| 2012/0030672 A1* | 2/2012 | Zygmuntowicz et al. | 718/1 |
| 2012/0233606 A1* | 9/2012 | Amanuddin et al. | 718/1 |
| 2012/0246647 A1* | 9/2012 | Ciano et al. | 718/1 |
| 2012/0266168 A1* | 10/2012 | Spivak et al. | 718/1 |

* cited by examiner

*Primary Examiner* — Dong Kim
(74) *Attorney, Agent, or Firm* — Polsinelli PC

(57) ABSTRACT

A method and apparatus for deploying an application in a converged infrastructure is described. The application may be deployed according a model that specifies deployment of the application on resources allocated from the converged infrastructure. The model may be used to scale and adjust the deployment of the application according to pre-determined best practices and according to deployment-specific parameters provided by a system administrator.

20 Claims, 4 Drawing Sheets

… (1)

PACKAGED APPLICATION DELIVERY FOR CONVERGED INFRASTRUCTURE

BACKGROUND OF THE INVENTION

Field of the Invention

Embodiments of the present invention generally relate to a method for deploying an application for execution in a virtualized environment.

Description of the Related Art

Generally, in a virtualized computer environment, virtual machines are configured to run on one or more host computers. Each virtual machine uses CPU and memory resources of one of the host computers and runs its own operating system and application programs to give the appearance that it is operating as a stand-alone computer system. The amount of CPU and memory resources provisioned for each of the virtual machines on a host computer can be designated by an administrator of the virtualized computer environment. In some virtualized environments, load balancing is enforced across multiple host computers by software that monitors resource usage on different host computers. Such software migrates virtual machines from one host computer to another, e.g., from a busy host computer to one that has excess capacity.

Additionally, enterprises engaged in developing, testing, and deploying software applications need to deal with many layers of the targeted platform. These layers include application services, virtualization, and hardware infrastructure with compute, network, storage, and management at all levels. Information technology (IT) and engineering groups also acquire, deploy, and provide ongoing management, as well as ensure the layers work seamlessly together. This increases an enterprise's initial and ongoing cost, extends the development cycle, and reduces flexibility needed to respond to changes in the market.

Further, the traditional enterprise information technology (IT) roles such as server administrator, UNIX administrator, and network, storage or exchange administrator, have been generally static. The roles operate in isolation, or "silos", which cause friction within IT organizations, as well as between developers and IT. Further, it is difficult for developers to play the role of IT administrator when their developed applications are deployed as "cloud applications." This difficulty is due not only to various access-controls, authentication and authorization complexities, but also to a model of organizational separation between developers and IT, where the default behavior is to deny access to the resources.

As such, there is a demand for a more efficient operational model for application delivery on computing infrastructure.

SUMMARY OF THE INVENTION

Embodiments of the present disclosure provide a method for deploying an application in a computing environment. The method generally includes receiving an application package having a plurality of functional components of an application and allocating a plurality of virtual resources from the computing environment according to a model for use of the virtual resources by the plurality of functional components. The method further includes deploying instances of the plurality of functional components of the application on the allocated virtual resources.

Another embodiment of the present disclosure provides a computing system for deploying an application in a computing environment. The computing system includes a storage device configured to store one or more application packages having a plurality of functional components of an application, and a management server. The management server is generally configured to allocate a plurality of virtual resources from the computing environment according to a model for use of the virtual resources by the plurality of functional components. The management server is further configured to deploy instances of the plurality of functional components of the application on the allocated virtual resources.

Embodiments of the present disclosure further provide a non-transitory computer-readable storage medium comprising instructions that, when executed in a computing device, deploy an application in a computing environment. The instructions, when executed in a computing device, generally perform the step of receiving an application package having a plurality of functional components of an application. The instructions further include allocating a plurality of virtual resources from the computing environment according to a model for use of the virtual resources by the plurality of functional components, and deploying instances of the plurality of functional components of the application on the allocated virtual resources.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the present disclosure use a computing block platform, sometimes referred to as converged infrastructure, that consolidates IT infrastructure into a pool of physical as well as virtualized computing, storage, and networking capacity that is shared by multiple application and lines of businesses have been proposed to address the problem of silo architectures and IT sprawl. However, the process for deploying an application on any such converged infrastructure may be manual and error prone. Further, deep working knowledge of both the converged infrastructure and the particular application to be deployed may be required.

Accordingly, embodiments of the present disclosure use a packaged application delivery mechanism to deploy applications having multiple functional components, which themselves may require complex configuration and setup. For example, in one embodiment, a deterministic approach is used to allocate resources per application within a pool of resources from the computing block platform. The application can be layered on the allocated resources and delivered in a prepackaged form. The packaged application delivery mechanism discovers a set of available converged infrastructure resources and determines the resources required for a given application that is to be deployed within the computing block platform. The mechanism provides a model that deploys services, functional components, tiers, nodes, etc. required by the application layer on top of the allocated services.

Figure 1:
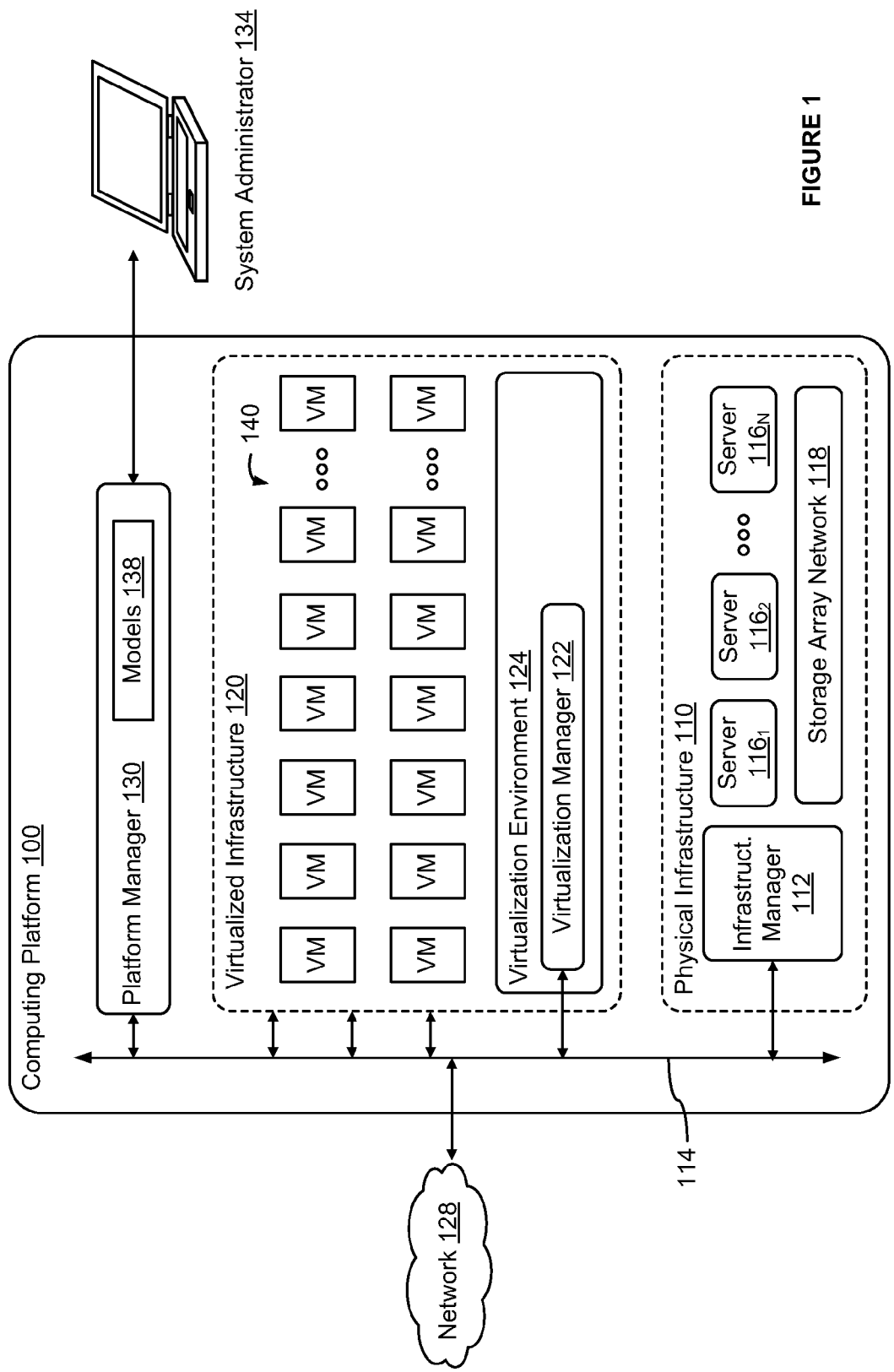
FIG. 1 illustrates a computing system configured for providing a virtualized environment according to one embodiment of the present disclosure.

FIG. 1 illustrates a computing platform 100 configured to provide a virtualized environment, according to one embodiment of the present disclosure. As shown, the computing platform 100 includes a physical infrastructure 110 configured to support a virtualized infrastructure 120. In the embodiment shown in FIG. 1, physical infrastructure 110 includes hardware resources, such as servers $116_1$ to $116_N$ (sometimes referred to as "hosts") and one or more storage array networks (SAN), such as SAN 118, connected by a network 114. The virtualized infrastructure 120 may include a virtualization environment 124 which itself includes one or more virtual machines 140. The computing platform 100 may be connected to other computing systems, such as workstations, personal computers, data center servers, via a network 128, such as the Internet. In one embodiment, components of the computing platform 100 (e.g., servers, network, storage, software, etc.) may be organized into a single integrated framework sometimes referred to as "converged infrastructure." The components of the computing platform 100 provide a pool of virtualized server, storage, network resources shared by multiple applications and/or organizations within an enterprise.

According to one embodiment, the physical infrastructure 110 may be organized into a "computing-block" based infrastructure, wherein physical infrastructure units are characterized by repeatable units of construction having similar performance, operational characteristics, and discrete requirements of power, space, and cooling that facilitate rapid deployment, integration, and scalability. For example, the "computing block" may dynamically provision hardware resources based on performance demands placed on the physical infrastructure 110. One example of physical infrastructure 110 is a Vblock™ System available from the VCE Company, LLC.

The physical infrastructure 110 further includes an infrastructure manager 112 configured to manage the configuration, provisioning, and policy compliance of the physical infrastructure 110. Infrastructure manager 112 provides an interface to manage the provisioning of hardware resources (e.g., computing, networking, storage) with policy-based automation. According to one embodiment, the infrastructure manager 112 may be included in each unit of physical infrastructure 110 to manage the configuration, provisioning, and compliance of each distinct computing block. The infrastructure manager 116 may simplify deployment and integration into IT service catalogs and workflow engines, and dramatically simplifies computing-block platform deployment by abstracting the overall provisioning while offering granular access to individual components for troubleshooting and fault management.

In one embodiment, the infrastructure manager 112 may include a configuration including a list of IP address and system credentials to assign newly provisioned systems. The platform manager 130 and/or the virtualized infrastructure 120 may connect to and communicate with the infrastructure manager 112 of the physical infrastructure 110 to manage and/or configure the physical infrastructure 110. One example of an infrastructure manager includes EMC Ionix Unified Infrastructure Manager (UIM) available from EMC Corporation. Similarly, the network 114 may include a network manager configured to configure network devices (e.g., switches, routers) and manage addressing, subnets, virtual local area networks (VLANs), and other network configurations. One example of a network manager includes a Cisco Switch accessible via a Cisco IOS command line interface (CLI) available from Cisco System, Inc.

The virtualized infrastructure 120 includes a virtualization environment 124 configured to simulate (i.e., to virtualize) conventional components of a computing device, e.g., a processor, system memory, a hard disk drive, for executing one or more virtual machines 140. For example, each virtual machine 140 may include a virtual processor and a virtual system memory configured to execute an application. In one example implementation of an embodiment similar to that of FIG. 1, virtualization environment 124 may be implemented by running VMware vSphere®- or VMware ESX®-based hypervisor technologies on servers $116_1$ to $116_n$ provided by VMware, Inc. of Palo Alto, Calif. (although it should be recognized that any other virtualization technologies, including Xen® and Microsoft Hyper-V virtualization technologies may be utilized consistent with the teachings herein). As described above, a hypervisor application may provide a foundation for building and managing a virtualized IT infrastructure, such as the virtualized infrastructure 120. The hypervisor may abstract processor, memory, storage and networking resources into multiple virtual machines that run unmodified operating systems and applications.

In one embodiment, the virtualized infrastructure 120 may be managed by a virtualization manager 122 (e.g., implemented as a process running in a virtual machine in one embodiment). In one embodiment, the virtualization manager 122 may provide end-to-end datacenter management through a set of APIs that enable integration with third-party management tools. The virtualization manager 122 may be configured to manage provision of VMs 140 within the virtualized infrastructure 120 and to configure VMs 140 with computing, network, and storage configurations suitable for interoperability with other VMs 140 within the virtualized infrastructure 120. One example of the virtualization manager 122 may be the VMware vCenter virtualized management platform from available from VMware, Inc.

As shown, the computing platform 100 also includes a platform manager 130 connected to the virtualized infrastructure 120 and physical infrastructure 110 by the communications network. The platform manager 130 is configured to deploy the application using the application package 132 on virtual resources (e.g., VMs 140) and physical resources (e.g., server 116, storage 118, network 114). The platform manager 130 is configured to provision resources from physical infrastructure 110 and virtualized infrastructure 120 for use in deploying an application within the computing platform 100. For example, if virtualized infrastructure 120 requires additional VMs to host newly deployed web applications or to scale currently running web applications to support peak performance demands, platform manager 130 can coordinate with the virtualization manager 122 to manage the instantiation and configuration of additional virtual machines to support such needs.

Figure 2:
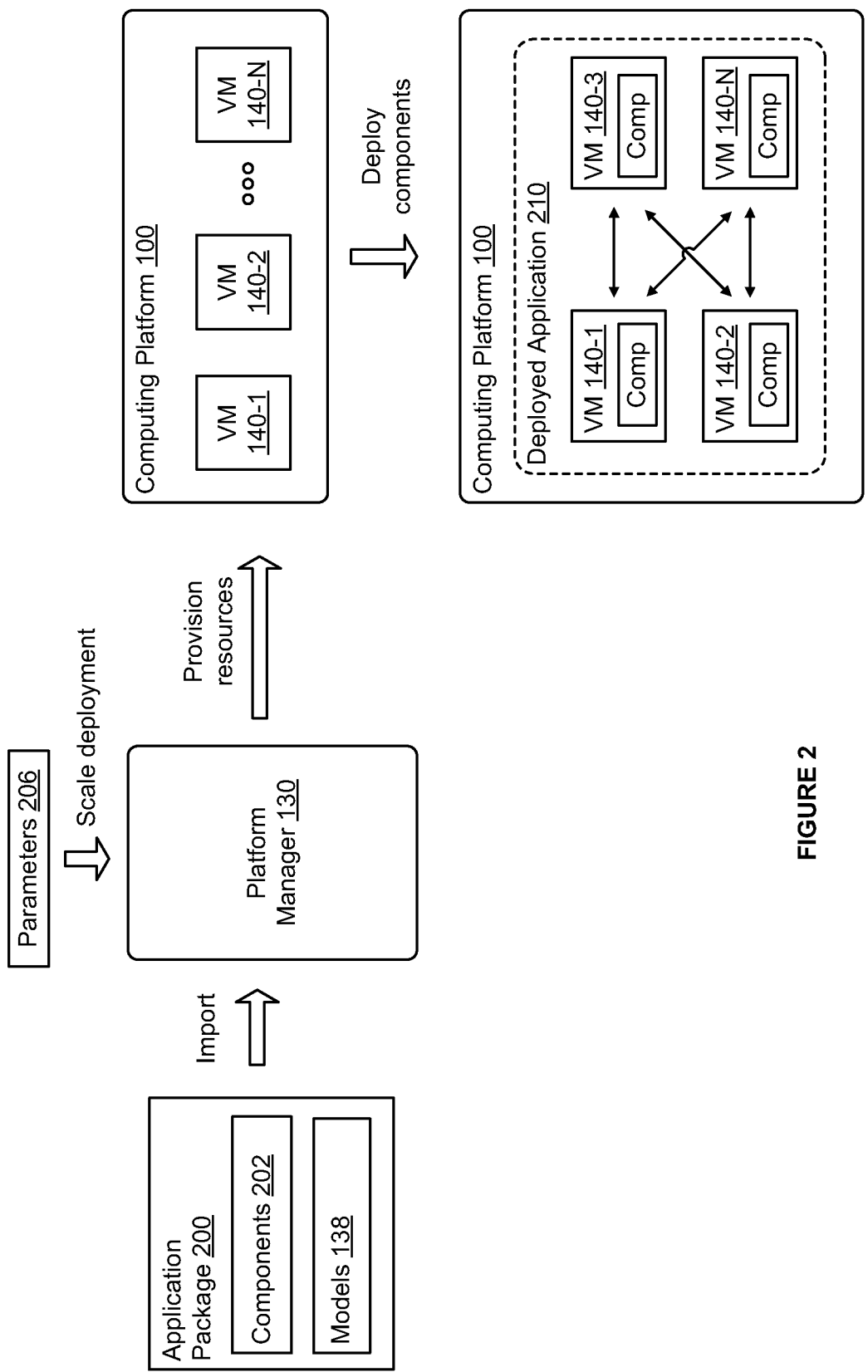
FIG. 2 illustrates an example workflow for deploying an application in the computing platform of FIG. 1, according to one embodiment of the present disclosure.

FIG. 2 illustrates an example operation for deploying an application in the computing platform of FIG. 1, according to one embodiment of the present disclosure. As shown, a system administrator 134 may provide the platform manager 130 with an application package 132 to be deployed on the computing platform 100 (e.g., on provisioned physical and virtual resources). An application package 132 represents a container of one or more virtual machines having pre-installed software components, operating systems, and configurations that comprise a multi-tiered application. Each VM of the application package 132 may represent a functional component 202 of the application that performs tasks of the application or provide a functional layer of the application (e.g., in a multi-tiered application). For example, an application package for a typical web application may include a first VM having a pre-installed web server, application server, and application code for the web application, and another VM having a pre-installed database server and configured to be connected to the first VM. The application package 132 may include files, including data, library, and metadata files in a format configured for packaging and distributing virtual machines, such as the Open Virtualization Format (OVF).

In one embodiment, the application package 132 also includes one or more models 138 indicating relationships between usage of the physical and virtual resources (e.g., VMs 140) and the components 202 of the application. The models 138 may represent the relationships between resources of the computing platform 100 and components 202 of the application using mathematical equations. For example, a model 138 may indicate a relationship between a number of instances (e.g., X) of a particular component of the application and a number of expected users (e.g., Y) of the application. For example, the model 138 may indicate that for a deployment to support Y users of the application, the deployment should include X instances of a component, where X=N+1, and N=(Y/500). Thus, a model 138 for an application may incorporate "best practices" for deploying the application. The particular "best practices" in a given case may be pre-determined, e.g., according to testing and empirical results determined by system engineers or may reflect industry-wide knowledge. In one embodiment, the models 138 may further include a detailed listing of physical resources, virtual resources, settings, and configurations typically needed to deploy an instance of the application. Examples of settings and configurations provided by the models 138 include networking settings, such as network configurations that indicate which components 202 may be located in a "management" portion of the network, in an externally accessible portion of the network, in a DMZ portion of the network, etc.

As described in detail below, the platform manager 130 is configured to adjust the deployment of the application based on the one or more models 138 and further based on deployment parameters 206 provided by a system administrator 134. For example, the platform manager 130 may adjust the deployment of a web application by increasing the number of VMs having a pre-installed web server based on a model 138 that indicates an increased number of web server VMs should be deployed based on input from the system administrator 134 indicating the expected amount of traffic for the web application. The system administrator 134 may provide parameters 206 that indicate deployment details that are specific to the particular instance of the application being deployed. Examples of parameters 206 include an anticipated number of users (e.g., 500 users), volume of traffic (e.g., 200 requests/second; 500 MB/sec), a desired uptime percentage (e.g., 99.999%), and a target resource utilization (e.g., 75% CPU utilization).

After determining whether (and how) to adjust the deployment of application based on the model 138 and parameters 206, the platform manager 130 may provision virtual and physical resources (e.g., VMs 140-1, 140-2, 140-3, etc.) from computing platform 100 and instantiate individual components 202 of the application package 132 to deploy the application 210 to virtualized infrastructure 120. While FIG. 2 depicts individual components 202 as modules executing on provisioned VMs (e.g., VMs 140-1, 140-2, 140-3, etc.), the platform manager 130 may alternatively instantiate whole VMs having pre-installed software components and operating systems based on information specified by the application package 132. The operations of the platform manager 130 are described in greater detail in conjunction with FIG. 4.

Figure 3:
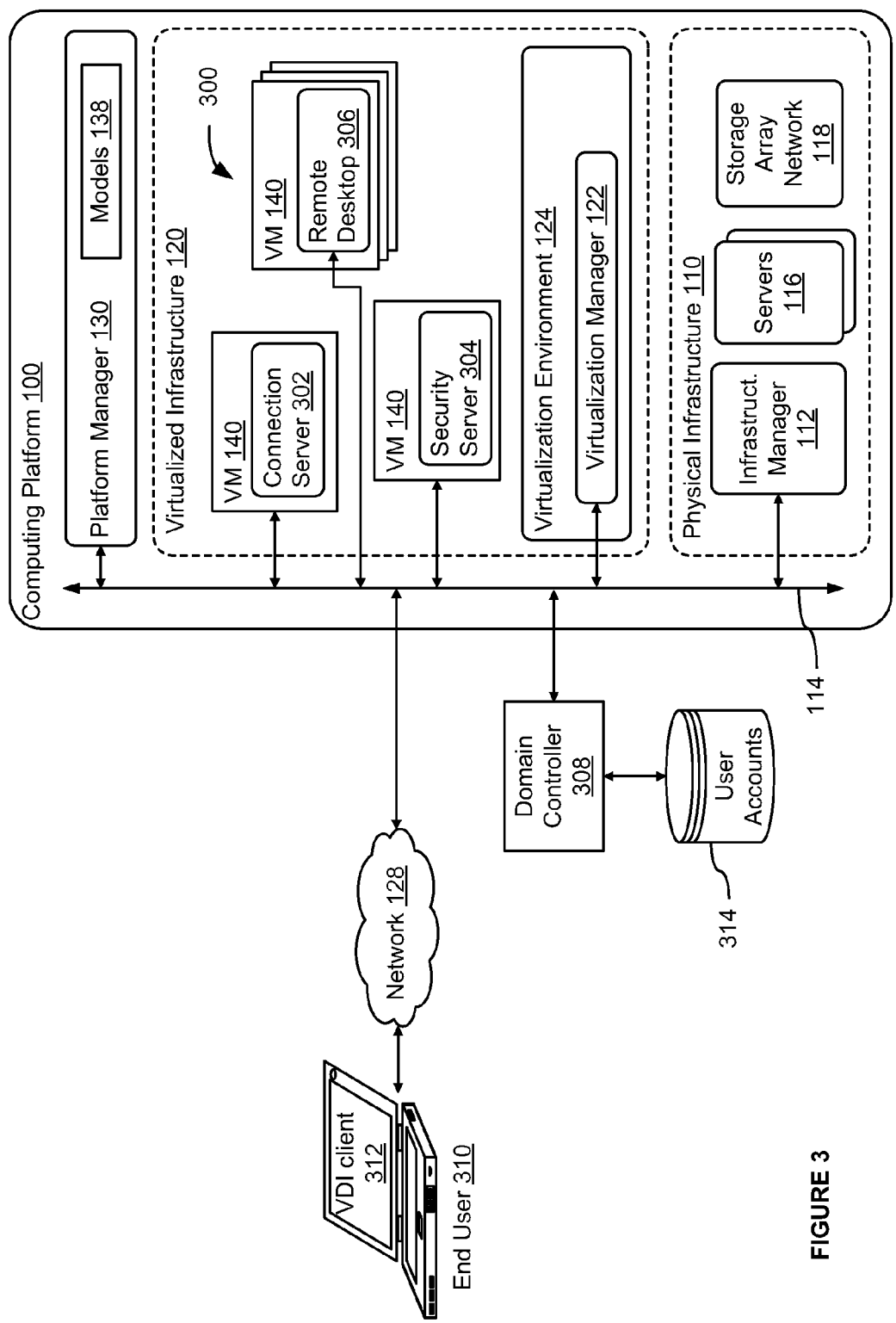
FIG. 3 illustrates an example application deployed on the computing system of FIG. 1, according to one embodiment of the present disclosure.

FIG. 3 illustrates an example application deployed on the computing platform of FIG. 1, according to one embodiment of the present disclosure. As shown, the platform manager 130 may deploy an application such as a virtual desktop infrastructure (VDI) 200 on a plurality of VMs 140 within the virtualized infrastructure 120. One example of VDI system 200 includes the VMware View system available from VMware, Inc.

In a VDI system 200, an end user 210 uses a VDI client software program (e.g., VDI client 212), running on an operating system of a local computing device, to access their desktop which may be running in one of VMs 140 in the computing platform 100 that may be remote from the end user's location. Note, the term "desktop" generally refers to the instance of an interactive operating environment provided by a computer operating system and software applications, typically in the form of a display and sound output and keyboard and mouse input. With VDI clients 212, users can access remote desktops 206 running in a remote data center (e.g., computing platform 100) through the network 128, from any location, using a general purpose computer running a commodity operating system and a VDI client software program such as VMware® View™, or a special purpose thin client such as those available from Dell, HP, NEC, Sun Microsystems, Wyse, and others.

As shown, the VDI system 300 includes connection servers 302 that provide user authentication for remote desktops 306 and direct incoming desktop requests (e.g., from VDI client 312) to a corresponding remote desktop 306. In one embodiment, the connection server 302 may communicate with a domain controller 308, such as Microsoft® Active Directory®, that manages user accounts 314 (e.g., user account for end user 310) including user log-in information. Connection server 302 and domain controller 308 may run on separate servers or VMs running on the same server or different servers. In the example depicted in FIG. 3, the connection server 302 is running on a VM 140 provided by the computing platform 100 and the domain controller 308 is running on an existing server or VM (e.g., legacy data center server). The components of VDI system 300 communicate via the network 114. For simplicity, a single network is shown but it should be recognized that, in actual implementations, the components of VDI system 300 may be connected over the same network or different networks. Furthermore, a particular configuration of the virtualized desktop infrastructure is described above and illustrated in FIG. 3, but it should be recognized that one or more embodiments of the present invention may be practiced with other configurations of the virtualized desktop infrastructure.

Illustratively, the VDI system 300 further includes one or more security servers 304 (e.g., executing in one or more VMs 140) that enable secure access to the remote desktops 306 from an external network, such as the Internet. The security server 304 may act as a proxy host for connections inside a trust network (e.g., network 114) and shields the connection server 302 from request a public-facing Internet. A network architecture for the VDI system 300 may be set up that includes one or more virtual local access networks (VLANs) between connection server 302, domain controller 308, security server 304, remote desktops 306, and network 128. For example, the security server 304 may be placed in a DMZ while a restricted number of ports are open to enable communication between the connection server 302 and the security server 304.

In one embodiment, the platform manager 130 may vary the number of instances of the components of the VDI system 300 when deploying the VDI system 300. For example, the platform manager varies the number of instances of the connection server 302, security server 304, remote desktops 306 based on the models 138. As noted, the models 138 could indicate the anticipated use of the VDI system 300. For example, a given deployment of the VDI system 300 may have multiple instances of the connection server 302 and/or the security server 304 for scaling and load balancing incoming remote desktop requests. Accordingly, the platform manager 130 may increase or decrease the instances of the components of the VDI system 300 (e.g., connection server 302, security server 304, remote desktops 306) to adjust and scale the size of the deployment of the VDI system 300.

While FIG. 3 depicts a particular example of an application (e.g., VDI system 300), other applications having a multi-tiered or distributed arrangement of parts may be deployed. For example, an application may be deployed having an application server layer, a data grid layer, and a database layer may be scaled and deployed within the computing platform 100.

Figure 4:
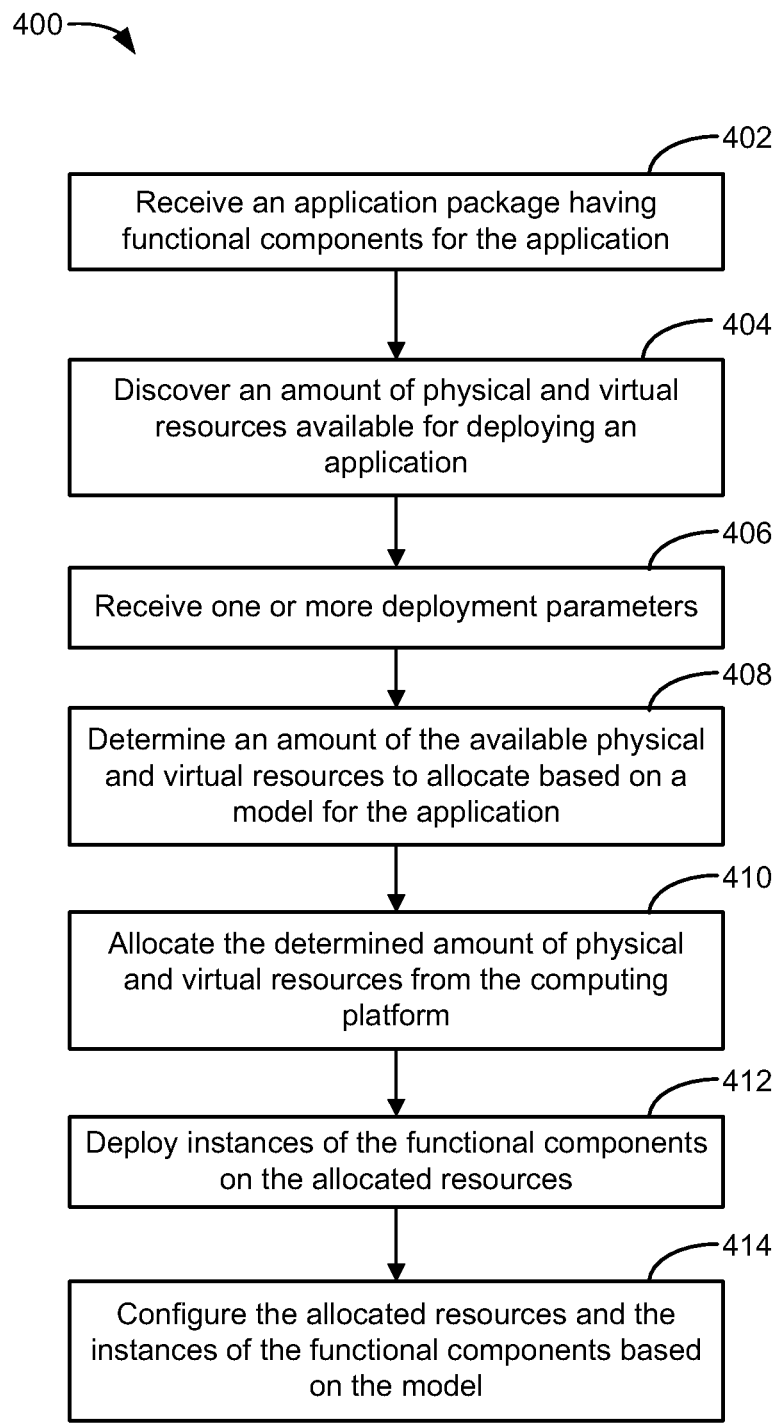
FIG. 4 is a flow diagram of method steps for deploying an application on computer resources in a virtualized environment, according to certain aspects of the present disclosure.

FIG. 4 is a flow diagram of a method 400 for deploying an application on computer resources in a virtualized environment, according to one embodiment. Persons skilled in the art will understand that, even though the method 400 is described in conjunction with the systems of FIGS. 1-3, any system configured to perform the method steps, in any order, is within the scope of embodiments of the present disclosure.

As shown, the method 400 begins at step 402, where the platform manager 130 receives an application package having one or more functional components (e.g., components 202) for the application to be deployed within the computing platform 100. For example, a system administrator 134 may provide an application package for a VDI system to the platform manager 130, such as the VDI system 300 described in FIG. 3. The application package may contain multiple pre-packaged VMs corresponding to each functional component of the application. For example, the application package for the VDI system may contain a pre-configured VM having pre-installed application components, software, libraries, and guest operating system for running a connection server 302, a pre-configured VM having pre-installed application components, software, libraries, and guest operating system for running a security server 304, and a pre-configured VM having pre-installed application components, software, libraries, and guest operating system for running a remote desktop 306.

At step 404, the platform manager 130 discovers an amount of available physical and virtual resources for deploying the application in the computing platform 100. The platform manager 130 may process the application package and determine resource requirements (e.g., memory, compute, storage, networking) specified for executing the application, and then query the virtualized infrastructure 120 and physical infrastructure 110 to determine whether such resources are available. For example, the platform manager 130 may determine that a VM corresponding to a functional component of the application requires 4 GB of RAM, a 64-bit processor, at least 200 GB of storage, and at least a gigabit Ethernet connection. The platform manager 130 may then communicate with the infrastructure manager 112 and the virtualization manager 122 to determine whether such resources are available from the physical infrastructure 110 and the virtualized infrastructure 120, respectively.

At step 406, the platform manager 130 receives deployment parameters (e.g., parameters 206) specifying how to adjust the deployment of the application using the models. The models 138 indicate how the resources provided by the computing platform 100 may be used by, for example, the functional components specified by the application package 132. The models 138 may indicate a function relating the use of physical resources and virtual resources (e.g., VMs) to a number of instances of each of the functional components. In one embodiment, the model may specify resources of the computing platform 100 to be used as a function of deployment parameters (e.g., as provided by the system administrator). For example, a model may specify that a deployment of a VDI system (e.g., VDI system 300) should include X instances of a connection server 302, where X=N+1 and N=(Y/500), in order to support Y users of the VDI system 300. As such, in this example, the system administrator 132 provides a value of "1000" for the deployment parameter of "number of users" (e.g., Y) to the platform manager 130 to adjust the deployment of the VDI system 300.

At step 408, the platform manager 130 determines what physical and virtual resources to allocate to the deployment based on a model 138 for the application. Continuing the VDI example described above, the platform manager 130 may evaluate the model 138 using the deployment parameters of "500 users" to determine that the deployment should have three instances of the connection server 202 (e.g., (1000/500)+1=3). The platform manager 130 determines an amount of virtual resources (e.g., VMs 140) sufficient to support execute of the three instances of the connection server 202.

At step 410, the platform manager 130 allocates physical and virtual resources from the computing platform 100. In one embodiment, the platform manager 130 may invoke a call that directs the virtualization manager 122 (e.g., through a set of APIs) to create one or more VMs (e.g., VMs 140) having virtual resources (e.g., VRAM, storage) to execute one of the functional components of the application. At step 412, the platform manager 130 deploys instances of the functional components 202 on the allocated resources. In embodiments where the functional components 202 are software packages, e.g., the platform manager 130 may install the software packages onto the provisioned VMs 140. Alternatively, in embodiments where the functional components of the application package 132 are pre-packaged VMs, the platform manager 130 may invoke a call that directs the virtualization manager 122 (e.g., through a set of APIs) to create one or more VMs (e.g., VMs 140) as clone of the pre-packaged VMs having the application components and guest operating system pre-installed thereon. For example, the platform manager 130 may create three instances of the connection server VM, one instance of the security server VM, and 50 instances of the remote desktop VM for a deployment of a VDI system 300.

At step 414, the platform manager 130 configures the allocated resources and the deployed instances of the functional components as specified by the model 138. In one embodiment, the platform manager 130 may "tune" the allocated resources of the computing platform 100 to meet the functional requirements of the application. For example, the platform manager 130 may modify default networking settings of the allocate resources to meet requirements of a VDI system 300 as specified by the model. Specifically, the platform manager 130 may configure the network 114 to create VLANs for a DMZ, for internal data network, for external access (e.g., via limited ports of a firewall), and for management purposes, where each VLAN may have a particular quality of service (QoS) setting. The platform manager 130 may further configure the deployed instances of the functional components 202 of the application based on adjustments made according to the model 138. For example, referring to the VDI example above, an instance of the connection server 302 may have default configurations that assume the instance is the sole connection server within the VDI system 300. However, in deployments where multiple connection servers are instantiated (e.g., based on the model 138), the platform manager 130 may modify the default configurations of multiple instances of the connection server 302 to function together (e.g., for replication and load balancing purposes). For example, the platform manager 130 may elect one of the instances of the connection server 130 as a "master" instance and enable a "replica" mode within the other instances, provide each instance with the known IP addresses of the other instances, etc.

Accordingly, embodiments of the present disclosure advantageously reduce errors and time in deploying an application, notably any application having multiple functional components. Further, because the models incorporate pre-determined best practices for deploying the application, embodiments of the present disclosure advantageously reduce the required knowledge of the specific application technology, and further of the converged infrastructure.

Various embodiments of the present disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

While the foregoing is directed to embodiments of the present disclosure, other and further embodiments of the present disclosure may be devised without departing from the basic scope thereof, and the scope thereof is determined by the claims that follow.

The invention claimed is:

1. A method for deploying applications in computing environments, the method comprising:
   receiving, using instructions stored on a non-transitory medium and executed on at least one processor, an application package including a plurality of functional components of an application;
   allocating, using the instructions executed on at least one processor, a plurality of virtual resources from a virtualized computing environment according to a model that specifies use of the virtual resources by the plurality of functional components included in the application; and
   deploying, using the instructions executed on at least one processor, one or more instances of the plurality of functional components on the allocated virtual resources, based on a deployment parameter, wherein the model comprises a function that determines a number of the instances to be deployed based upon a number of expected users, and wherein the deployment parameter comprises an expected user number parameter of the function, wherein the function is of a form X=N+1, wherein X is a value quantifying a number of the instances deployed, and wherein N is a function of the expected user number divided by an integer greater than 1.

2. The method of claim 1, wherein the function relates the use of the virtual resources to the number of instances of each of the plurality of functional components.

3. The method of claim 1, wherein allocating the plurality of virtual resources from the computing environment comprises:
   receiving a deployment parameter for the model for use of the virtual resources by the plurality of functional components,
   determining, based on the model specifying the plurality of the virtual resources as a function of the received deployment parameter, the plurality of virtual resources to be allocated from the computing environment based on the model.

4. The method of claim 1, further comprising:
   modifying at least one of the instances of the plurality of functional components of the application based on the model, wherein the model further specifies a plurality of configuration settings for the instances of the functional components and the allocated virtual resources.

5. The method of claim 1, further comprising:
   determining an amount of virtual resources and physical resources from the computing platform that are available for execution of instances of the functional components of the application.

6. The method of claim 1, wherein the application package comprises one or more virtual machine instances, each virtual machine instance having at least one software component and a guest operating system.

7. A computing system for deploying an application in a computing environment, comprising:
   a storage device configured to store one or more application packages including a plurality of functional components of an application, and
   a management server to:

allocate a plurality of virtual resources from a virtualized computing environment according to a model that specifies use of the virtual resources by the plurality of functional components included in the application; and deploy one or more instances of the plurality of functional components on the allocated virtual resources, based on a deployment parameter, wherein the model comprises a function that determines a number of the instances to be deployed based upon a number of expected users, wherein the deployment parameter comprises an expected user number parameter of the function, the function is of a form X=N+1, wherein X is a value quantifying a number of the instances deployed, and wherein N is a function of the expected user number divided by an integer greater than 1.

8. The computer system of claim 7, wherein the function relates the use of the virtual resources to the number of instances of each of the plurality of functional components.

9. The computer system of claim 7, wherein to allocate the plurality of virtual resources from the computing environment further comprises:

receiving a deployment parameter for the model for use of the virtual resources by the plurality of functional components; and determining, based on the model specifying the plurality of the virtual resources as a function of the received deployment parameter, the plurality of virtual resources to be allocated from the computing environment based on the model.

10. The computer system of claim 7, wherein the management server further:

modifies at least one of the instances of the plurality of functional components of the application based on the model, wherein the model further specifies a plurality of configuration settings for the instances of the functional components and the allocated virtual resources.

11. The computer system of claim 7, wherein the management server further:

determines an amount of virtual resources and physical resources from the computing platform that are available for execution of instances of the functional components of the application.

12. The computer system of claim 7, wherein the application package comprises one or more virtual machine instances, each virtual machine instance having at least one software component and a guest operating system.

13. A non-transitory computer-readable storage medium comprising instructions that, when executed in a computing device, deploy an application in a computing environment, by performing the steps of:

receiving an application package including a plurality of functional components of an application;

allocating a plurality of virtual resources from a virtualized computing environment according to a model that specifies use of the virtual resources by the plurality of functional components included in the application; and deploying one or more instances of the plurality of functional components on the allocated virtual resources, based on a deployment parameter, wherein the model comprises a function that determines a number of the instances to be deployed based upon a number of expected users, and wherein the deployment parameter comprises an expected user number parameter of the function, the function is of a form X=N+1, wherein X is a value quantifying a number of the instances deployed, and wherein N is a function of the expected user number divided by an integer greater than 1.

14. The non-transitory computer-readable storage medium of claim 13, wherein the function relates the use of the virtual resources to the number of instances of each of the plurality of functional components.

15. The non-transitory computer-readable storage medium of claim 13, wherein the instructions for allocating the plurality of virtual resources from the computing environment further comprises instructions for:

receiving a deployment parameter for the model for use of the virtual resources by the plurality of functional components, determining, based on the model specifying the plurality of the virtual resources as a function of the received deployment parameter, the plurality of virtual resources to be allocated from the computing environment based on the model.

16. The non-transitory computer-readable storage medium of claim 13, further comprising instructions for modifying at least one of the instances of the plurality of functional components of the application based on the model, wherein the model further specifies a plurality of configuration settings for the instances of the functional components and the allocated virtual resources.

17. The non-transitory computer-readable storage medium of claim 13, further comprising instructions for determining an amount of virtual resources and physical resources from the computing environment that are available for execution of instances of the functional components of the application.

18. The non-transitory computer-readable storage medium of claim 13, wherein the application package comprises one or more virtual machine instances, each virtual machine instance having at least one software component and a guest operating system.

19. The method of claim 1, wherein the function is of a form X=N+1, wherein X is a value quantifying a number of the instances deployed, and wherein N is the is the function of the expected user number/500.

20. The non-transitory computer-readable storage medium of claim 13, wherein the function is of a form X=N+1, wherein X is a value quantifying a number of the instances deployed, and wherein N is the function of the expected user number/500.

* * * * *